United States Patent
Krishnan et al.

(10) Patent No.: US 9,421,666 B2
(45) Date of Patent: Aug. 23, 2016

(54) PRINTED CHEMICAL MECHANICAL POLISHING PAD HAVING ABRASIVES THEREIN

(71) Applicant: Applied Materials, Inc., Santa Clara, CA (US)

(72) Inventors: Kasiraman Krishnan, Milpitas, CA (US); Nag B. Patibandla, Pleasanton, CA (US); Periya Gopalan, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 14/511,057

(22) Filed: Oct. 9, 2014

(65) Prior Publication Data

US 2015/0126099 A1    May 7, 2015

Related U.S. Application Data

(60) Provisional application No. 61/899,754, filed on Nov. 4, 2013.

(51) Int. Cl.
*B24B 37/24*     (2012.01)
*B33Y 10/00*    (2015.01)
(Continued)

(52) U.S. Cl.
CPC ............... *B24B 37/245* (2013.01); *B24D 3/28* (2013.01); *B24D 18/0054* (2013.01);
(Continued)

(58) Field of Classification Search
CPC ...... B24B 37/245; B33Y 10/00; B33Y 80/00; B24D 3/23; B24D 18/0054; B29C 67/0059; B29C 67/0066; B29K 2101/10; B29K 2101/16

USPC ........................................................ 451/529
See application file for complete search history.

(56) References Cited

U.S. PATENT DOCUMENTS 3,759,864 A * 9/1973 Nicks .......................... C08J 3/21
                                                                    523/463
4,750,915 A * 6/1988 Tomita ..................... B24D 3/34
                                                                    51/298

(Continued)

FOREIGN PATENT DOCUMENTS

KR    10-0303672    11/2001
KR    10-2005-0052876    6/2005
KR    10-2008-0038607    5/2008

OTHER PUBLICATIONS

International Search Report and Written Opinion in International Application No. PCT/US2014/061838, mailed Jan. 27, 2015, 9 pages.

(Continued)

*Primary Examiner* — George Nguyen
(74) *Attorney, Agent, or Firm* — Fish & Richardson P.C.

(57) ABSTRACT

A method of fabricating a polishing layer of a polishing pad includes determining a desired distribution of particles to be embedded within a polymer matrix of the polishing layer. A plurality of layers of the polymer matrix is successively deposited with a 3D printer, each layer of the plurality of layers of polymer matrix being deposited by ejecting a polymer matrix precursor from a nozzle. A plurality of layers of the particles is successively deposited according to the desired distribution with the 3D printer. The polymer matrix precursor is solidified into a polymer matrix having the particles embedded in the desired distribution.

16 Claims, 2 Drawing Sheets

(51) Int. Cl.
*B33Y 80/00* (2015.01)
*B24D 3/28* (2006.01)
*B24D 18/00* (2006.01)
*B29C 67/00* (2006.01)
*B29K 101/10* (2006.01)
*B29K 105/16* (2006.01)

(52) U.S. Cl.
CPC ........ *B29C 67/0059* (2013.01); *B29C 67/0066* (2013.01); *B33Y 10/00* (2014.12); *B33Y 80/00* (2014.12); *B29K 2101/10* (2013.01); *B29K 2105/16* (2013.01)

(56) References Cited

U.S. PATENT DOCUMENTS

| | | | | |
|---|---|---|---|---|
| 5,197,999 | A * | 3/1993 | Thomas | B24B 37/24 51/298 |
| 5,387,380 | A | 2/1995 | Cima et al. | |
| 5,738,574 | A | 4/1998 | Tolles et al. | |
| 5,861,208 | A * | 1/1999 | Schreck | B32B 27/20 428/327 |
| 5,876,490 | A | 3/1999 | Ronay | |
| 5,900,164 | A | 5/1999 | Budinger et al. | |
| 5,921,855 | A | 7/1999 | Osterheld et al. | |
| 5,932,290 | A | 8/1999 | Lombardi et al. | |
| 5,940,674 | A * | 8/1999 | Sachs | B22F 3/115 264/414 |
| 6,390,890 | B1 * | 5/2002 | Molnar | B24B 37/042 451/285 |
| 6,423,255 | B1 * | 7/2002 | Hoechsmann | B29C 67/0081 264/113 |
| 6,875,097 | B2 * | 4/2005 | Grunwald | B24D 3/346 451/533 |
| 7,531,117 | B2 * | 5/2009 | Ederer | B29C 67/0081 264/113 |
| 7,966,743 | B2 * | 6/2011 | Piatt | B41J 11/002 118/715 |
| 9,017,060 | B2 * | 4/2015 | Huang | B24B 53/017 425/388 |
| 2001/0020448 | A1 * | 9/2001 | Vaartstra | C23C 16/4486 118/724 |
| 2001/0046834 | A1 | 11/2001 | Ramana et al. | |
| 2002/0142705 | A1 * | 10/2002 | Sugiura | B24B 19/226 451/41 |
| 2004/0154533 | A1 | 8/2004 | Agarwal et al. | |
| 2005/0020082 | A1 | 1/2005 | Vishwanathan et al. | |
| 2005/0110853 | A1 | 5/2005 | Gardner et al. | |
| 2006/0019587 | A1 | 1/2006 | Deopura et al. | |
| 2006/0192315 | A1 | 8/2006 | Farr et al. | |
| 2007/0054600 | A1 * | 3/2007 | Watanabe | B24D 3/28 451/36 |
| 2007/0093185 | A1 | 4/2007 | Naik | |
| 2007/0128991 | A1 | 6/2007 | Yoon et al. | |
| 2007/0235904 | A1 | 10/2007 | Saikin | |
| 2008/0157436 | A1 * | 7/2008 | Patel | B29C 67/0081 264/401 |
| 2009/0093201 | A1 | 4/2009 | Kazuno et al. | |
| 2009/0321979 | A1 * | 12/2009 | Hiraide | B29C 67/0074 264/113 |
| 2010/0323050 | A1 | 12/2010 | Kumagai et al. | |
| 2011/0059247 | A1 * | 3/2011 | Kuzusako | B22C 7/02 427/372.2 |
| 2013/0283700 | A1 | 10/2013 | Bajaj et al. | |

OTHER PUBLICATIONS

International Search Report and Written Opinion in International Application No. PCT/US2013/035513, mailed Jun. 25, 2013, 12 pages.
'Wikipedia' [online] "3D printing," 2013, [retrieved on Feb. 25, 2013]. Retrieved from the Internet: URL:http://en.wikipedia.org/wiki/3D_printing 17 pages.

* cited by examiner

PRINTED CHEMICAL MECHANICAL POLISHING PAD HAVING ABRASIVES THEREIN

CROSS-REFERENCE TO RELATED APPLICATIONS

This application claims priority to U.S. Provisional Patent Application Ser. No. 61/899,754, filed Nov. 4, 2014, the entire disclosure of which is incorporated by reference.

TECHNICAL FIELD

This present invention relates to polishing pads used in chemical mechanical polishing.

BACKGROUND

An integrated circuit is typically formed on a substrate by the sequential deposition of conductive, semiconductive, or insulative layers on a silicon wafer. A variety of fabrication processes require planarization of a layer on the substrate. For example, for certain applications, e.g., polishing of a metal layer to form vias, plugs, and lines in the trenches of a patterned layer, an overlying layer is planarized until the top surface of a patterned layer is exposed. In other applications, e.g., planarization of a dielectric layer for photolithography, an overlying layer is polished until a desired thickness remains over the underlying layer.

Chemical mechanical polishing (CMP) is one accepted method of planarization. This planarization method typically requires that the substrate be mounted on a carrier head. The exposed surface of the substrate is typically placed against a rotating polishing pad. The carrier head provides a controllable load on the substrate to push it against the polishing pad. A polishing liquid, such as slurry with abrasive particles, is typically supplied to the surface of the polishing pad.

One objective of a chemical mechanical polishing process is polishing uniformity. If different areas on the substrate are polished at different rates, then it is possible for some areas of the substrate to have too much material removed ("overpolishing") or too little material removed ("underpolishing").

Conventional polishing pads include "standard" pads and fixed-abrasive pads. A standard pad has a polyurethane polishing layer with a durable roughened surface, and can also include a compressible backing layer. In contrast, a fixed-abrasive pad has abrasive particles held in a containment media, and can be supported on a generally incompressible backing layer. However, commercially available fixed-abrasive pads are generally limited to specific materials, e.g., cerium oxide.

Polishing pads are typically made by molding, casting or sintering polyurethane materials. In the case molding, the polishing pads can be made one at a time, e.g., by injection molding. In the case of casting, the liquid precursor is cast and cured into a cake, which is subsequently sliced into individual pad pieces. These pad pieces can then be machined to a final thickness. Grooves can be machined into the polishing surface, or be formed as part of the injection molding process.

In addition to planarization, polishing pads can be used for finishing operations such as buffing.

SUMMARY

An end user of a chemical mechanical polishing apparatus typically obtains consumables, such as polishing pads and polishing slurry, from one or more vendors. The polishing slurry typically contains a suspension of abrasive particles in a fluid. The fluid typically includes additional chemistry to ensure that abrasive particles are properly suspended in the fluid and do not form undesirable agglomerations of abrasive particles, which could result in scratching or other defects and render the polishing slurry unsuitable for polishing.

In order to lower cost of ownership for the end user, and to reduce waste disposal, the polishing pad and the abrasive particles can be combined into a single entity, by embedding the abrasive particles into the pad itself. However, embedding particles into pads poses various problems. As a result, abrasive materials embedded in polishing pads have been limited to materials such as cerium oxides. Although alumina abrasive particles have been proposed, a polishing pad with alumina particles has not been practical to commercialize. At least one problem in the manufacture of a polishing pad with alumina abrasive particles has been the difficulty in suspending alumina abrasive particles in polymers (e.g., thermoset polymer) used to fabricate the polishing pads. For example, suspensions of alumina abrasive particles in the polymer solutions are not uniformly distributed. The non-uniform distribution leads to agglomeration of the alumina abrasive particles, and the agglomeration leads to defects when the polishing pad is used to polished substrates.

A technique for manufacturing polishing pads that have different abrasive particles embedded therein is to use a 3D printing process. In a 3D printing process a thin layer of pad precursor, e.g., a powder or liquid precursor, is progressively deposited and fused or cured to form a full 3-dimensional polishing pad. The abrasive particles are then selectively deposited within the printed layer of pad precursor.

In one aspect, a method of fabricating a polishing layer of a polishing pad, includes determining a desired distribution of particles to be embedded within a polymer matrix of the polishing layer. The method includes successively depositing a plurality of layers of the polymer matrix with a 3D printer, each layer of the plurality of layers of polymer matrix being deposited by ejecting a polymer matrix precursor from a nozzle, Successively depositing the plurality of layers includes distributing the particles in the plurality of layers according to the desired distribution with the 3D printer. The method includes solidifying the polymer matrix precursor to form a solidified polymer matrix having the particles embedded in the desired distribution.

Implementations can include one or more of the following features. The method may further include premixing the polymer matrix precursor with the particles according to the desired distribution to form a mixture that is ejected by the nozzle. The polymer matrix precursor may be a liquid thermoset polymer. The polymer matrix precursor may be a molten thermoplastic polymer. The polymer matrix precursor may be ejected from the nozzle of a first printhead and the particles may be ejected from the nozzle of a second printhead. The particles may be made of material selected from the group consisting of silica, ceramic, metal, metal oxide, and polymer. The silica may be fumed or colloidal. The particles may be alumina. The particles may be abrasive particles. The particles may further include reactive particles that undergo chemical reactions when the polishing layer is used for polishing. The particles may have a hollow core. The particles may have sizes of up to 1 millimeter, e.g., less than 10 µm, e.g., less than 1 µm. The particles may be round, elongated or faceted. The polishing layer may include pores formed by the hollow core of particles. Solidifying the polymer matrix precursor may include curing the polymer matrix precursor. Curing the polymer matrix precursor may include ultraviolet (UV) curing. Curing the polymer matrix precursor may include thermal curing. The thermal curing may be done with a laser or an IR lamp. The polymer matrix precursor may include a urethane monomer. The solidified polymer matrix may include polyurethane, acrylate, epoxy, acrylonitrile butadiene styrene (ABS), polyetherimide, or polyamide. Solidifying the polymer matrix precursor includes cooling the polymer matrix precursor. The desired distribution may be a uniform distribution of the particles within the polymer matrix. The desired distribution may be a patterned distribution of the particles within the polymer matrix. The polymer matrix precursor and particles may be deposited to produce patterned surface features on a surface of the polishing pad. The patterned surface features may include elongated grooves. The patterned surface features may include elevated features resembling buttons.

In another aspect, a polishing pad includes a polishing layer having a polymer matrix and a desired distribution of particles embedded within the polymer matrix. The desired distribution of particles includes different distribution densities of the particles across the polishing layer.

Implementations can include one or more of the following features. The polishing pad may include elongated grooves on a surface of the polishing pad. The particles may have sizes of up to 1 millimeters, e.g., less than 10 µm, e.g., less than 1 µm. The particles may be round, elongated or faceted. The polymer matrix may include polyurethane, acrylate, an epoxy, acrylonitrile butadiene styrene (ABS), polyetherimide, or polyamide.

In another aspect, a method of fabricating a polishing layer of a polishing pad includes premixing a polymer matrix precursor with particles to form a mixture. The polymer matrix precursor used to fabricate a polymer matrix of the polishing layer. The method includes agitating the mixture prior to ejecting the mixture from a nozzle of a 3D printer and successively depositing a plurality of layers of the polymer matrix with the 3D printer. Each layer of the plurality of layers of polymer matrix being deposited by ejecting the polymer matrix precursor from the nozzle. Successively depositing the plurality of layers includes depositing the particles in the plurality of layers with the 3D printer. The method includes solidifying the polymer matrix precursor to form a solidified polymer matrix having the particles embedded therein.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
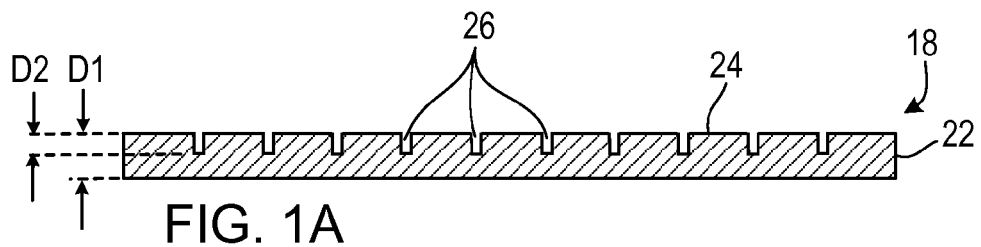
FIG. 1A is a schematic cross-sectional side view of an example polishing pad.
Figure 1B:
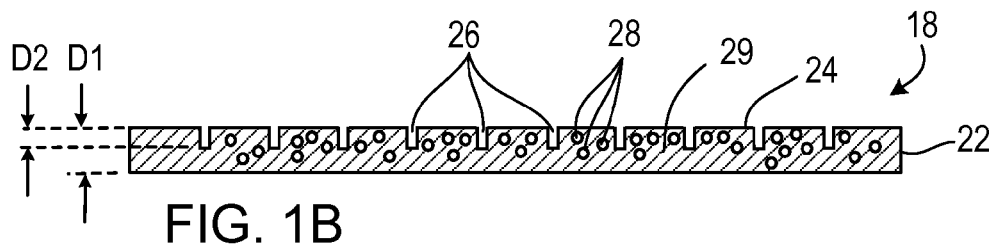
FIG. 1B is a schematic cross-sectional side view of another example polishing pad.
Figure 1C:
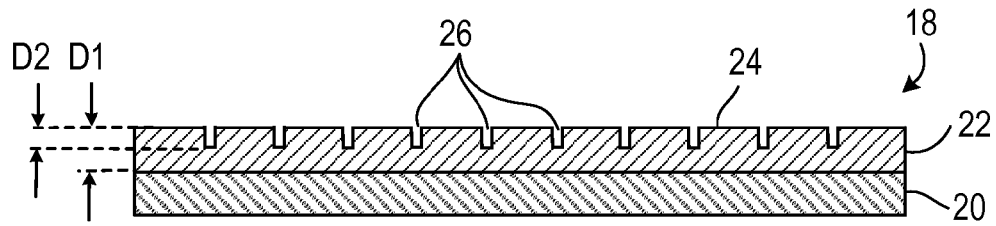
FIG. 1C is a schematic cross-sectional side view of yet another example polishing pad.

Referring to FIG. 1A-1C, a polishing pad 18 includes a polishing layer 22. As shown in FIG. 1A the polishing pad can be a single-layer pad that consists of the polishing layer 22, or as shown in FIG. 1C the polishing pad can be a multi-layer pad that includes the polishing layer 22 and at least one backing layer 20.

The polishing layer 22 can be a material that is inert in the polishing process. The material of the polishing layer 22 can be a plastic, e.g., polyurethane, acrylate, epoxy, acrylonitrile butadiene styrene (ABS), polyetherimide, or polyamides. In some implementations the polishing layer 22 is a relative durable and hard material. For example, the polishing layer 22 can have a hardness of about 40 to 80, e.g., 50 to 65, on the Shore D scale.

As shown in FIG. 1A, the polishing layer 22 can be a layer of homogeneous composition, or as shown in FIG. 1B the polishing layer 22 can include abrasive particles 28 held in a matrix 29 of plastic material, e.g., polyurethane, acrylate, epoxy, acrylonitrile butadiene styrene (ABS), polyetherimide, or polyamides. The abrasive particles 28 are harder than the material of the matrix 29. The abrasive particles 28 can be from 0.05 wt % to 75 wt % of the polishing layer. For example, the abrasive particles 28 can be less than 1 wt % of the polishing layer 22, e.g., less than 0.1 wt %. Alternatively, the abrasive particles 28 can be greater than 10 wt % of the polishing layer 22, e.g., greater than 50 wt %. The material of the abrasive particles can be a metal oxide, such as ceria, alumina, silica or a combination thereof, polymeric, intermetallic or ceramics.

In some implementations, the polishing layer includes pores, e.g., small voids. The pores can be 50-100 microns wide. The polishing layer 18 can have a thickness D1 of 80 mils or less, e.g., 50 mils or less, e.g., 25 mils or less. Because the conditioning process tends to wear away the cover layer, the thickness of the polishing layer 22 can be selected to provide the polishing pad 18 with a useful lifetime, e.g., 3000 polishing and conditioning cycles.

On a microscopic scale, the polishing surface 24 of the polishing layer 22 can have rough surface texture, e.g., 2-4 microns rms. For example, the polishing layer 22 can be subject to a grinding or conditioning process to generate the rough surface texture. In addition, 3D printing can provide small uniform features, e.g., down to 200 microns.

Although the polishing surface 24 can be rough on a microscopic scale, the polishing layer 22 can have good thickness uniformity on the macroscopic scale of the polishing pad itself (this uniformity refer to the global variation in height of the polishing surface 24 relative to the bottom surface of the polishing layer, and does not count any macroscopic grooves or perforations deliberately formed in the polishing layer). For example, the thickness non-uniformity can be less than 1 mil.

Optionally, at least a portion of the polishing surface 24 can include a plurality of grooves 26 formed therein for carrying slurry. The grooves 26 may be of nearly any pattern, such as concentric circles, straight lines, a cross-hatched, spirals, and the like. Assuming grooves are present, then the polishing surface 24, i.e., the plateaus between the grooves 26, can be about i.e., can be 25-90% of the total horizontal surface area of the polishing pad 22. Thus, the grooves 26 can occupy 10%-75% of the total horizontal surface area of the polishing pad 18. The plateaus between the grooves 26 can have a lateral width of about 0.1 to 2.5 mm.

In some implementations, e.g., if there is a backing layer 20, the grooves 26 can extend entirely through the polishing layer 22. In some implementations, the grooves 26 can extend through about 20-80%, e.g., 40%, of the thickness of the polishing layer 22. The depth of the grooves 26 can be 0.25 to 1 mm. For example, in a polishing pad 18 having a polishing layer 22 that is 50 mils thick, the grooves 26 can have a depth D2 of about 20 mils.

The backing layer 20 can be softer and more compressible than the polishing layer 22. The backing layer 20 can have a hardness of 80 or less on the Shore A scale, e.g., a hardness of about have a hardness of 60 Shore A. The backing layer 20 can be thicker or thinner or the same thickness as the polishing layer 22.

For example, the backing layer can be an open-cell or a closed-cell foam, such as polyurethane or polysilicone with voids, so that under pressure the cells collapse and the backing layer compresses. A suitable material for the backing layer is PORON 4701-30 from Rogers Corporation, in Rogers, Conn., or SUBA-IV from Rohm & Haas. The hardness of the backing layer can be adjusted by selection of the layer material and porosity. The backing layer can also be formed of natural rubber, ethylene propylene diene monomer (EPDM) rubber, nitrile, or polychloroprene (neoprene). Alternatively, the backing layer 20 formed from the same precursor and have the same porosity as the polishing layer, but have a different degree of curing so as to have a different hardness.

Figure 2:
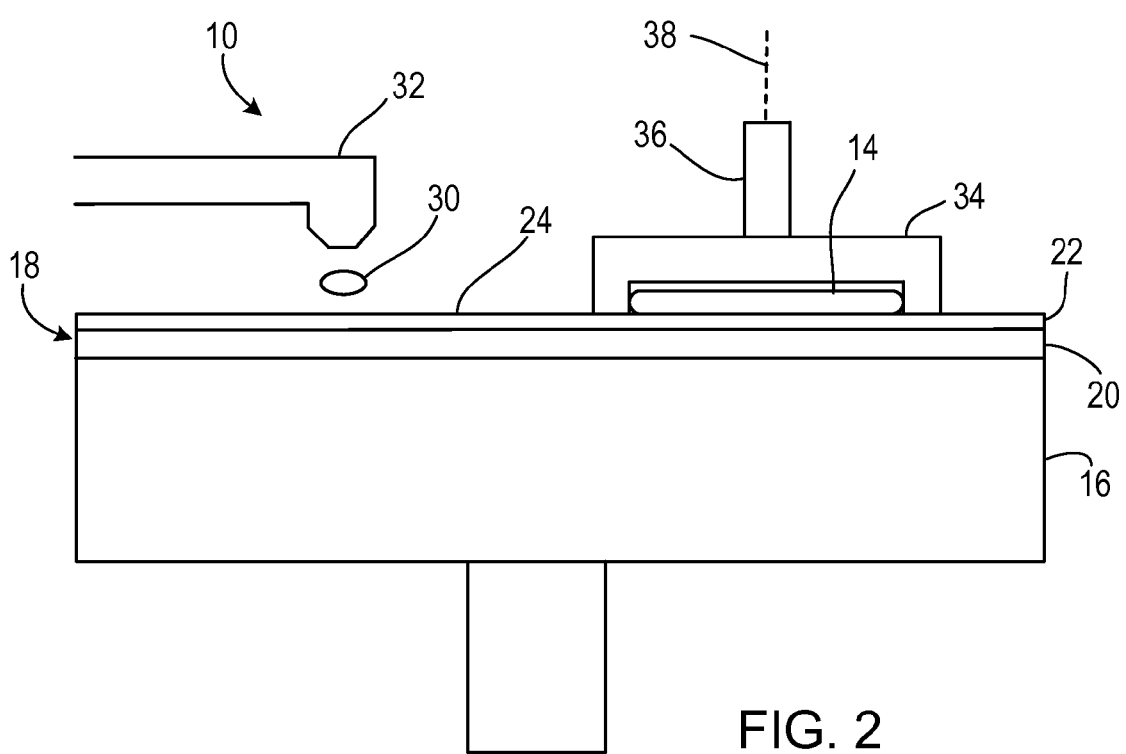
FIG. 2 is a schematic side view, partially cross-sectional, of a chemical mechanical polishing station.

Turning now to FIG. 2, one or more substrates 14 can be polished at a polishing station 10 of a CMP apparatus. A description of a suitable polishing apparatus can be found in U.S. Pat. No. 5,738,574, the entire disclosure of which is incorporated herein by reference.

The polishing station 10 can include a rotatable platen 16 on which is placed the polishing pad 18. During a polishing step, a polishing liquid 30, e.g., abrasive slurry, can be supplied to the surface of polishing pad 18 by a slurry supply port or combined slurry/rinse arm 32. The polishing liquid 30 can contain abrasive particles, a pH adjuster, or chemically active components.

The substrate 14 is held against the polishing pad 18 by a carrier head 34. The carrier head 34 is suspended from a support structure, such as a carousel, and is connected by a carrier drive shaft 36 to a carrier head rotation motor so that the carrier head can rotate about an axis 38. The relative motion of the polishing pad 18 and the substrate 14 in the presence of the polishing liquid 30 results in polishing of the substrate 14.

Figure 3A:
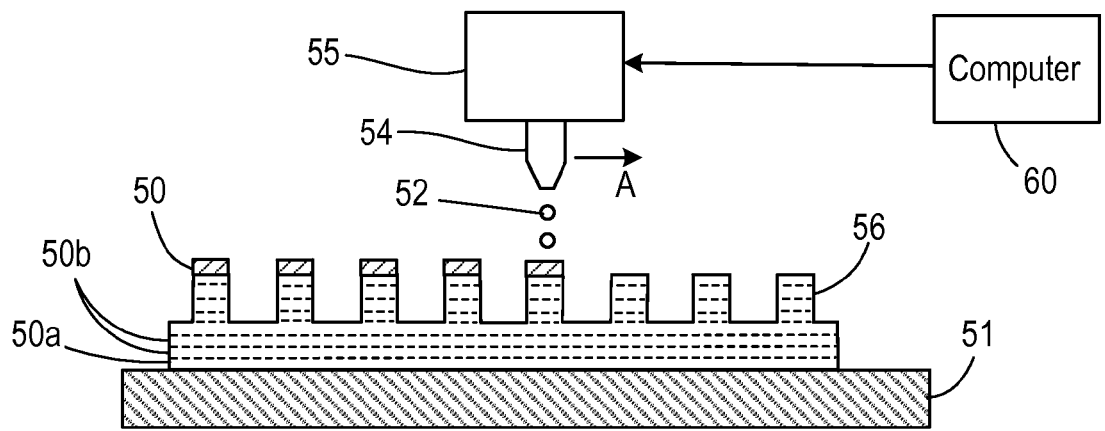
FIG. 3A is a schematic cross-sectional side view illustrating an exemplary 3D printer used to fabricate a polishing pad.

3D printing offers a convenient and highly controllable process for producing polishing pads with abrasives embedded in specific locations within the polishing layer. Referring to FIG. 3A, at least the polishing layer 22 of the polishing pad 18 is manufactured using a 3D printing process. In the manufacturing process, thin layers of material are progressively deposited and fused. For example, droplets 52 of pad precursor material can be ejected from a nozzle 54 of a droplet ejecting printer 55 to form a layer 50. The droplet ejecting printer is similar to an inkjet printer, but uses the pad precursor material rather than ink. The nozzle 54 translates (shown by arrow A) across a support 51.

For a first layer 50a deposited, the nozzle 54 can eject onto the support 51. For subsequently deposited layers 50b, the nozzle 54 can eject onto the already solidified material 56. After each layer 50 is solidified, a new layer is then deposited over the previously deposited layer until the full 3-dimensional polishing layer 22 is fabricated. Each layer is applied by the nozzle 54 in a pattern stored in a 3D drawing computer program that runs on a computer 60. Each layer 50 is less than 50% of the total thickness of the polishing layer 22, e.g., less than 10%, e.g., less than 5%, less than 1%.

The support 51 can be a rigid base, or be a flexible film, e.g., a layer of polytetrafluoroethylene (PTFE). If the support 51 is a film, then the support 51 can form a portion of the polishing pad 18. For example, the support 51 can be the backing layer 20 or a layer between the backing layer 20 and the polishing layer 22. Alternatively, the polishing layer 22 can be removed from the support 51.

In general, abrasive particles 23 are locally dispensed into polishing layer while the polishing layer 22 is printed layer by layer. Local dispensing of the abrasive particles helps to avoid agglomeration.

Specifically, the abrasive particles 23 can be premixed with a liquid thermoset polymer precursor. Continuous agitation of the mixture of the thermoset polymer precursor and the abrasive particles prevents agglomeration of the particles, similar to apparatus used to homogenize ink pigments used in ink jet printers. In addition, the continuous agitation of the mixture ensures fairly uniform distribution of the abrasive particles in the precursor. This can result in a more uniform distribution of particles through the polishing layer, which can lead to improved polishing uniformity and can also help avoid agglomeration.

The premixed mixture is dispensed from a single nozzle (e.g., the nozzle 54) according to a particular pattern. For example, the premixed mixture can be uniformly dispensed to produce a homogeneous polishing layer 22 having a uniform distribution of embedded abrasive particles throughout the polishing layer 22.

Figure 3B:
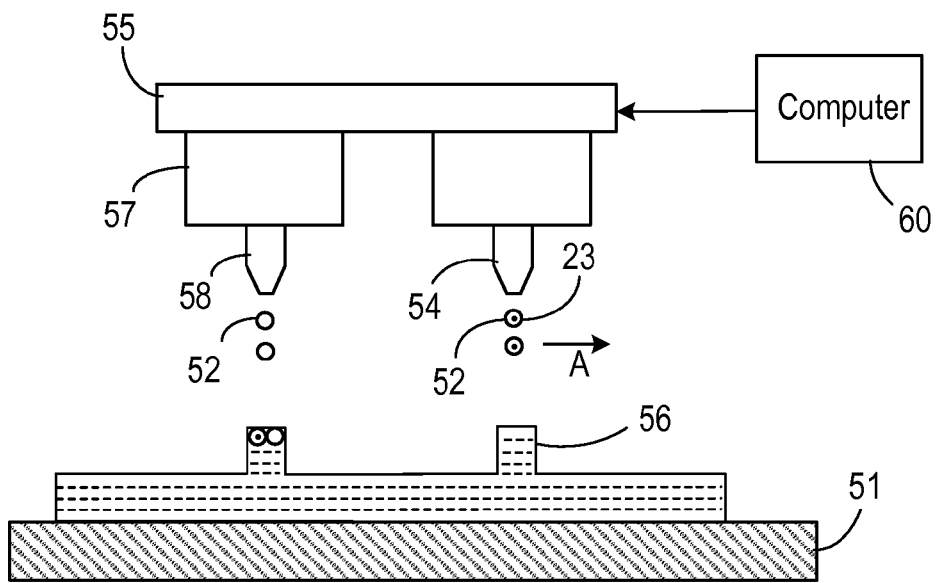
FIG. 3B is a schematic cross-sectional side view illustrating an exemplary 3D printer used to fabricate a polishing pad.

Alternatively, a separate printhead 57 having a nozzle 58, as shown in FIG. 3B, can be used to dispense pure liquid thermoset polymer precursors (i.e., without any abrasive particles), while the premixed mixture is dispensed only at selected locations. These selected locations collectively form the desired printing pattern of the abrasive particles and can be stored as a CAD-compatible file that is then read by an electronic controller (e.g., the computer 60) that controls the printer. Electronic control signals are then sent to the printer 55 to dispense the premixed mixture only when the nozzle 54 is translated to the position specified by the CAD-compatible file.

Alternatively, instead of using a liquid thermoset polymer precursor, the abrasive particles can be premixed with a molten thermoplastic. In this case, the mixture with abrasive particles is also continuously agitated prior to being dispensed. After the mixture is dispensed from the 3D printer according to a desired printing pattern, the molten portion of the mixture cools and solidifies, and the abrasive particles are frozen in place. The continuous agitation of the mixture ensures fairly uniform distribution of the abrasive particles in the precursor. This can result in a more uniform distribution of particles through the polishing layer, which can lead to improved polishing uniformity and can also help avoid agglomeration Similar to the case when liquid thermoset polymer precursor is used, the thermoplastic mixture can be uniformly dispensed to produce a uniform distribution of abrasive particles across the entire polishing layer 22. Alternatively, the thermoplastic mixture containing the abrasive particles can be dispensed only at selected locations in the polishing layer, according to a desired printing pattern of the abrasive particles that is stored as a CAD-compatible file and read by an electronic controller used to drive the printer 55.

Rather than dispensing abrasive particles in a suspension from the nozzle 54, abrasive particles can be dispensed directly in powder form from the nozzle 54, while a different printhead 57 is used to dispense the pad polymer precursor. The polymer precursor is first dispensed before abrasive particles are dispensed into the deposited polymer material, and the mixture is then subsequently cured.

Although 3D printing is particularly useful to construct polishing pads using abrasive particles, e.g., alumina, that would be prone to agglomeration, this approach can be used for other polishing particles. Thus, the abrasive particles can include silica, ceramic oxides, metals and hard polymers.

The printheads can print particles that are either solid or particles that have a hollow core. The printhead can also dispense different types of particles, some of which can undergo chemical reactions during CMP processing to produce desired changes on the layer of the substrate that is being polished Examples of chemical reactions used in CMP processing for polishing pad include chemical processes that occur within the basic pH range of 10-14 that involve one or more of potassium hydroxide, ammonium hydroxide and other proprietary chemical processes used by manufactures of slurry. Chemical processes that occur within an acidic pH range of 2-5 involving organic acids such as acetic acid, citric acid are also used in CMP processing. Oxidization reactions involving hydrogen peroxide are also examples of chemical reactions used in CMP processing. Abrasive particles can also be used only to provide mechanically abrasive functions. The particles can have sizes up to 1 millimeter, e.g., less than 10 μm, e.g., less than 1 μm, and the particles can have different morphology, for example, the particles can be round, elongated or faceted.

Pores within the polishing pad have conventionally been used to locally retain slurry within the polishing pad. With the abrasive particles being held by the matrix, it may no longer be necessary for the polishing pad to contain pores. Pores can still be selectively distributed within the printed polishing pad by depositing hollow spheres at locations where pores are desired.

Solidification can be accomplished by polymerization. For example, the layer 50 of pad precursor material can be a monomer, and the monomer can be polymerized in-situ by ultraviolet (UV) curing. The pad precursor material can be cured effectively immediately upon deposition, or an entire layer 50 of pad precursor material can be deposited and then the entire layer 50 be cured simultaneously.

However, there are alternative technologies to accomplish 3D printing. Alternatively, the printer creates the polishing layer 22 by spreading a layer of powder that includes abrasive particles 23 as additives, and ejecting droplets of a binder material onto the layer of powder The 3D printing approach allows tight tolerances to be achieved in the distribution of abrasive particles that are embedded in the polishing layer due to the layer-by-layer printing approach. Also, one printing system (with printer 55 and computer 60) can be used to manufacture a variety of different polishing pads, simply by changing the pattern stored in the 3D drawing computer program.

In some implementations, the backing layer 20 can also be fabricated by a 3D printing process. For example, the backing layer 20 and polishing layer 22 could be fabricated in an uninterrupted operation by the printer 55. The backing layer 20 can be provided with a different hardness than the polishing layer 22 by using a different amount of curing, e.g., a different intensity of UV radiation.

In other implementations, the backing layer 20 is fabricated by a conventional process and then secured to the polishing layer 22. For example, the polishing layer 22 can be secured to the backing layer 20 by a thin adhesive layer 28, e.g., as a pressure-sensitive adhesive.

A number of implementations have been described. Nevertheless, it will be understood that various modifications may be made. For example, either the polishing pad, or the carrier head, or both can move to provide relative motion between the polishing surface and the substrate. The polishing pad can be a circular or some other shape. An adhesive layer can be applied to the bottom surface of the polishing pad to secure the pad to the platen, and the adhesive layer can be covered by a removable liner before the polishing pad is placed on the platen. In addition, although terms of vertical positioning are used, it should be understood that the polishing surface and substrate could be held upside down, in a vertical orientation, or in some other orientation.

Accordingly, other implementations are within the scope of the following claims.

What is claimed is:

1. A method of fabricating a polishing layer of a polishing pad, comprising:
    receiving a computer-readable file containing data setting a desired distribution of particles to be embedded within a polymer matrix of the polishing layer;
    successively depositing a plurality of layers of the polymer matrix with a 3D printer, the polymer matrix of each layer of the plurality of layers being deposited by ejecting a polymer matrix precursor from a nozzle of the 3D printer;
    dispensing the particles from the 3D printer;
    controlling the 3D printer in response to the data setting the desired distribution of particles so that successively depositing the plurality of layers includes distributing the particles in the plurality of layers according to the desired distribution with the 3D printer;
    solidifying the polymer matrix precursor to form a solidified polymer matrix having the particles embedded in the desired distribution.

2. The method of claim 1, wherein the polymer matrix precursor is a liquid thermoset polymer precursor, and solidifying the polymer matrix precursor comprises curing the polymer matrix precursor.

3. The method of claim 2, wherein curing the polymer matrix precursor comprises ultraviolet (UV) curing or thermal curing.

4. The method of claim 1, wherein the polymer matrix precursor is a molten thermoplastic polymer, and solidifying the polymer matrix precursor comprises cooling the polymer matrix precursor.

5. The method of claim 1, further comprising premixing the polymer matrix precursor with the particles according to the desired distribution to form a mixture that is ejected by the nozzle.

6. The method of claim 1, wherein the polymer matrix precursor is ejected from the nozzle of a first printhead and the particles are ejected from the nozzle of a second printhead.

7. The method of claim 1, wherein the particles are made of material selected from the group consisting of silica, ceramic, metal, metal oxide, and polymer.

8. The method of claim 1, wherein the particles are abrasive particles.

9. The method of claim 8, wherein the particles further comprise reactive particles that undergo chemical reactions when the polishing layer is used for polishing.

10. The method of claim 1, wherein the particles have a hollow core.

11. The method of claim 10, wherein the polishing layer comprises pores formed by the hollow core of the particles.

12. The method of claim 1, wherein the particles have sizes of up to 1 millimeter.

13. The method of claim 1, wherein the particles are round, elongated or faceted.

14. The method of claim 1, wherein the desired distribution is a patterned distribution of the particles within the polymer matrix.

15. The method of claim 1, wherein the polymer matrix precursor and particles are deposited to produce patterned surface features on a surface of the polishing pad.

16. The method of claim 15, wherein the patterned surface features comprise elongated grooves.

* * * * *